(12) United States Patent
Dolle et al.

(10) Patent No.: US 9,952,564 B2
(45) Date of Patent: Apr. 24, 2018

(54) CIRCUIT ARRANGEMENT AND METHOD FOR CONTROLLING THE OPERATION OF A PLURALITY OF COMPONENTS REQUIRING A SUPPLY IN A CIRCUIT ARRANGEMENT

(71) Applicant: Infineon Technologies AG, Neubiberg (DE)

(72) Inventors: Michael Dolle, Grasbrunn (DE); Stephan Junge, Munich (DE); Nikolai Sefzik, Markt Schwaben (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 765 days.

(21) Appl. No.: 14/306,288

(22) Filed: Jun. 17, 2014

(65) Prior Publication Data

US 2014/0368037 A1  Dec. 18, 2014

(30) Foreign Application Priority Data

Jun. 17, 2013 (DE) .................. 10 2013 106 285

(51) Int. Cl.
*G05B 11/01* (2006.01)
*G06F 1/32* (2006.01)
*H02J 4/00* (2006.01)

(52) U.S. Cl.
CPC .............. *G05B 11/01* (2013.01); *G06F 1/324* (2013.01); *G06F 1/3206* (2013.01); *G06F 1/3228* (2013.01); *H02J 4/00* (2013.01); *Y02B 60/1217* (2013.01); *Y02B 60/32* (2013.01); *Y10T 307/406* (2015.04)

(58) Field of Classification Search
CPC ............................. G06F 1/324; G06F 1/3206
See application file for complete search history.

(56) References Cited

U.S. PATENT DOCUMENTS

| 6,415,388 B1 * | 7/2002 | Browning ............... G06F 1/206 |
| | | 702/132 |
| 7,395,439 B2 * | 7/2008 | Elbe ................... G06K 19/0723 |
| | | 713/300 |

(Continued)

FOREIGN PATENT DOCUMENTS

| CN | 101951022 A | 1/2011 |
| CN | 102695997 A | 9/2012 |

(Continued)

*Primary Examiner* — Thienvu Tran
*Assistant Examiner* — Pinping Sun
(74) *Attorney, Agent, or Firm* — Viering, Jentschura & Partner mbB (57) ABSTRACT

According to various embodiments, a circuit arrangement is described that has a plurality of components requiring a supply. Each component requiring a supply is set up to output a signal that indicates a subsequent power requirement of the component requiring a supply. The circuit arrangement further has a control device that is set up to take the signals as a basis for ascertaining a value that represents a subsequent power requirement of the plurality of components requiring a supply, to ascertain whether the value satisfies a prescribed criterion, and to control the operation of the components requiring a supply on the basis of whether the value satisfies the prescribed criterion.

18 Claims, 4 Drawing Sheets

(56) References Cited

U.S. PATENT DOCUMENTS

| | | | |
|---|---|---|---|
| 7,898,225 B2* | 3/2011 | Tsai | G01R 21/06 323/222 |
| 8,339,891 B2* | 12/2012 | Arntzen | G06F 1/3203 365/226 |
| 2004/0139358 A1 | 7/2004 | Elbe et al. | |
| 2008/0091853 A1* | 4/2008 | Dolle | H03K 19/0016 710/29 |
| 2009/0031152 A1* | 1/2009 | Bolderl-Ermel | G06F 1/266 713/300 |
| 2009/0049318 A1* | 2/2009 | Bose | G06F 1/206 713/320 |
| 2010/0328828 A1 | 12/2010 | Xu | |
| 2010/0332876 A1* | 12/2010 | Fields, Jr. | G06F 1/3203 713/323 |
| 2013/0024707 A1* | 1/2013 | Miwa | G06F 1/3225 713/322 |
| 2013/0073878 A1* | 3/2013 | Jayasimha | G06F 1/3287 713/300 |
| 2013/0124885 A1* | 5/2013 | Davis | G06F 1/3206 713/320 |
| 2013/0253720 A1* | 9/2013 | Luo | G06F 1/26 700/295 |

FOREIGN PATENT DOCUMENTS

| | | |
|---|---|---|
| CN | 102804537 A | 11/2012 |
| DE | 10127423 A1 | 12/2002 |
| DE | 102006036770 A1 | 2/2008 |
| WO | 2011084805 A1 | 7/2011 |

* cited by examiner

CIRCUIT ARRANGEMENT AND METHOD FOR CONTROLLING THE OPERATION OF A PLURALITY OF COMPONENTS REQUIRING A SUPPLY IN A CIRCUIT ARRANGEMENT

CROSS-REFERENCE TO RELATED APPLICATION

This application claims priority to German Patent Application Serial No. 10 2013 106 285.7, which was filed Jun. 17, 2013, and is incorporated herein by reference in its entirety.

TECHNICAL FIELD

Various embodiments relate generally to circuit arrangements and methods for controlling the operation of a plurality of components requiring a supply in a circuit arrangement.

BACKGROUND

Simultaneously switching on loads, i.e. components requiring a supply, in a chip can lead to the resultant change of current causing disturbances, such as a dip in the supply voltage and malfunctions arising therefrom. This can occur, by way of example, when many loads are switched on simultaneously, e.g. when a plurality of components requiring a supply wake from a quiescent state simultaneously, when the buffer capacity of the chip is relatively small, e.g. when using production technologies that produce very small structures, when only a few supply voltage connections are existent, such as in the case of a chip card, and when a chip-internal voltage regulator cannot readjust the supply voltage quickly enough on account of its present state.

Slowly switching on the loads (e.g. activating the loads in succession) can achieve the effect that the power consumption increases more slowly. Typically, however, this also leads to reduced performance capability in comparison with simultaneously switching on the loads. A higher buffer capacity typically requires a larger surface area and a higher price for the product (e.g. for the chip or the apparatus containing the chip). Similarly, a voltage regulator that allows a faster rise in power consumption typically results in a greater surface area requirement and a higher price for the product.

SUMMARY

According to various embodiments, a circuit arrangement is described that has a plurality of components requiring a supply. Each component requiring a supply is set up to output a signal that indicates a subsequent power requirement of the component requiring a supply. The circuit arrangement further has a control device that is set up to take the signals as a basis for ascertaining a value that represents a subsequent power requirement of the plurality of components requiring a supply, to ascertain whether the value satisfies a prescribed criterion, and to control the operation of the components requiring a supply on the basis of whether the value satisfies the prescribed criterion.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

The detailed description that follows relates to the appended figures, which show details and exemplary embodiments. These embodiments are described in such detail that a person skilled in the art is able to implement the invention. Other embodiments are also possible and the exemplary embodiments can be changed in structural, logical and electric respects without departing from the subject matter of the invention. The various embodiments do not necessarily exclude one another, but rather various embodiments can be combined with one another, so that new embodiments are produced.

Various embodiments provide a circuit arrangement that allows malfunctions on account of an excessive increase in the power consumption of a plurality of components requiring a supply to be avoided.

According to various embodiments, a circuit arrangement is provided that has a plurality of components requiring a supply. Each component requiring a supply is set up to output a signal that indicates the subsequent power requirement of the component requiring a supply. The circuit arrangement may further include a control device that is set up to take the signals as a basis for ascertaining a value that represents a subsequent power requirement of the plurality of components requiring a supply, to ascertain whether the value satisfies a prescribed criterion and to control the operation of the components requiring a supply on the basis of whether the value satisfies the prescribed criterion.

According to various embodiments, a method for controlling the operation of a plurality of components requiring a supply in a circuit arrangement according to the circuit arrangement described above is provided.

According to various embodiments, an electronic system, in other words a circuit arrangement, for example on a chip card, that can be integrated fully or partially into one or more chips has a plurality of functional units or components requiring a supply. By way of example, these components may be computation units, memories, peripheral appliances or communication interfaces. By way of example, all components are supplied with a clock signal by a central clock generator. In this case, the current draw (and hence the power consumption) of the components is dependent on the clock frequency. All components may be independent of one another in the quiescent state and then consume no (or very little) current. If many of the components become active simultaneously, for example after waking from the quiescent state, it is possible (without any regulating measure) for the resultant change of current to be so great that a power supply component (e.g. a voltage regulator) is no longer able to readjust in good time and the voltage dips and can result in a malfunction in the functional components.

According to various embodiments, the operation of the components requiring a supply is controlled on the basis of the subsequent power requirement of the component requiring a supply. By way of example, regulating measures can be taken when it is established that a subsequent total power requirement (i.e. the sum of the power requirements of the components requiring a supply) is so high that, without any measures, the power consumption would be above what a power supply component that supplies power to the components to be supplied with the power is able to deliver.

A circuit arrangement according to various embodiments is described below with reference to FIG. 1.

Figure 1:
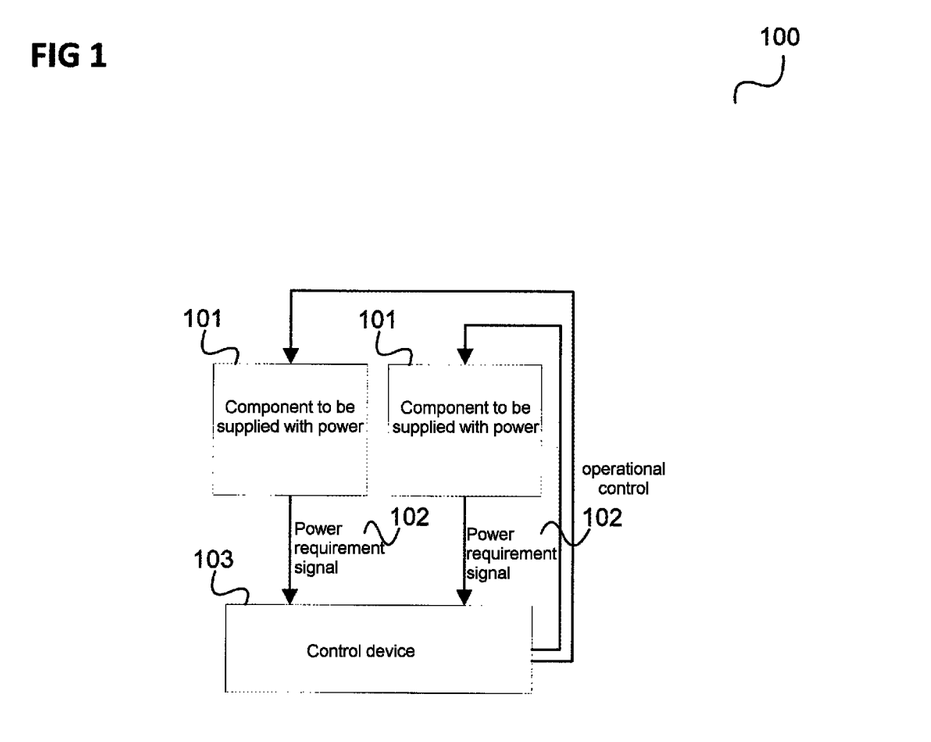
FIG. 1 shows a circuit arrangement according to an embodiment.

FIG. 1 shows a circuit arrangement 100 according to various embodiments.

The circuit arrangement 100 has a plurality of components requiring a supply. Each component requiring a supply is set up to output a signal 102 that indicates a subsequent power requirement of the component requiring a supply.

The circuit arrangement also has a control device 103 that is set up to take the signals 102 as a basis for ascertaining a value that represents a subsequent power requirement of the plurality of components requiring a supply, to ascertain whether the value satisfies a prescribed criterion and to control the operation of the components requiring a supply on the basis of whether the value satisfies the prescribed criterion.

By way of example, the control device can recognize changes in current (or changes in power requirement) that exceed a critical degree (e.g. a limit that can be tolerated by a power supply component) and can initiate measures, i.e. can control the operation of the components requiring a supply such that the change in current is reduced to an acceptable degree.

By way of example, the criterion is whether the value is above a prescribed threshold value. The control device 103 controls the operation of the components to be supplied with power such that, by way of example, the power consumption of the components requiring a supply is below the prescribed threshold value. By way of example, the control device 103 establishes that the power requirement of the components requiring a supply (for example in the case of a constant mode of operation, e.g. a constant clock frequency) would be above the threshold value and reduces the clock frequency (or takes a different measure), as a result of which the power consumption is below the threshold value.

By way of example, the circuit arrangement has a power supply component (e.g. a voltage regulator) that is set up to supply power to the components requiring a supply and to output the threshold value.

By way of example, the threshold value represents a maximum power that can be delivered from the power supply component to the components requiring a supply. The threshold value can change over time.

According to one embodiment, the control device is set up to weight, for each component requiring a supply, the subsequent power requirement of the component requiring a supply using a prescribed weight and to ascertain the value on the basis of the weighted power requirements. Alternatively, it is also possible for any of the components requiring a supply to output a value that already represents their weighted power requirement, e.g. as a binary number. Hence, it is also possible to represent that the power requirement of a component may be different, e.g. dependent on the activity.

By way of example, the control device is set up to ascertain the value by summing the weighted power requirements.

According to one embodiment, the control device is set up to control the clock frequency of the components requiring a supply on the basis of whether the value satisfies the prescribed criterion. By way of example, the control device sets the clock frequency to a higher or a lower value depending on whether the value satisfies the criterion.

The control device may also be set up to control the supply voltage for the components requiring a supply on the basis of whether the value satisfies the prescribed criterion. By way of example, the control device sets the supply voltage to a higher or a lower value depending on whether the value satisfies the criterion.

The control device may also be set up to keep one or more of the components requiring a supply in a quiescent state on the basis of whether the value satisfies the prescribed criterion.

By way of example, the signal indicates a subsequent activity of the component requiring a supply. By way of example, the signal indicates whether or not the component is subsequently (e.g. in the next clock cycle) in a quiescent state.

By way of example, the signal indicates whether the component requiring a supply is subsequently active.

According to one embodiment, each component requiring a supply is set up to output the signal in one clock cycle, and the signal indicates the power requirement of the component requiring a supply in a later clock cycle. By way of example, the later clock cycle is the clock cycle that follows the clock cycle.

By way of example, the circuit arrangement has a chip that contains the components requiring a supply. The chip may also contain the further units, such as the control device, the power supply device and the clock generator.

According to various embodiments, the control device is set up to ascertain a maximum permissible power consumption of the components requiring a supply, whether, in the case of a first operating parameter of the plurality of components requiring a supply and in the case of the power requirement provided by the value, the power consumption of the components to be supplied with the power is above the maximum permissible power consumption, and to control the operation of the components requiring a supply on the basis of the first operating parameter if the power consumption of the components requiring a supply is not above the maximum permissible power consumption in the case of the first operating parameter and in the case of the power requirement provided by the value, and to control the operation of the components requiring a supply on the basis of a second operating parameter if the power consumption of the components requiring a supply is above the maximum permissible power consumption in the case of the first operating parameter and in the case of the power requirement provided by the value.

By way of example, the power consumption of the components requiring a supply is lower in the case of the second operating parameter than in the case of the first operating parameter.

By way of example, the first operating parameter and the second operating parameter are frequencies of a clock signal for the components requiring a supply or values of the supply voltage for the components requiring a supply.

By way of example, the circuit arrangement is arranged on a chip card, e.g. fully or partially in a chip card module.

Figure 2:
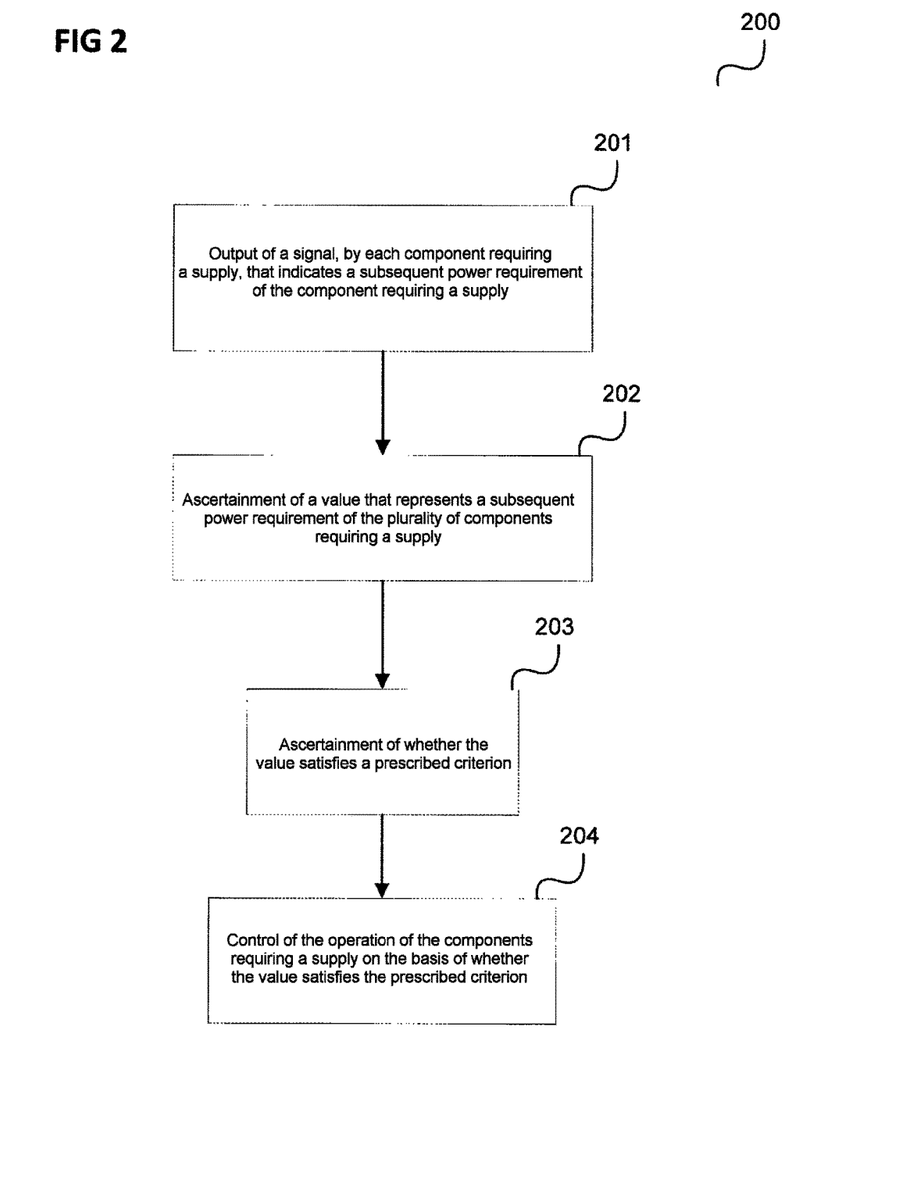
FIG. 2 shows a flowchart that illustrates a method for controlling the operation of a plurality of components requiring a supply in a circuit arrangement according to an embodiment.

By way of example, the circuit arrangement carries out a method as shown in FIG. 2.

FIG. 2 shows a flowchart 200.

The flowchart illustrates a method for controlling the operation of a plurality of components requiring a supply in a circuit arrangement.

In 201, each component requiring a supply outputs a signal that indicates a subsequent power requirement of the component requiring a supply.

In 202, a value is ascertained, e.g. by a control device, that represents a subsequent power requirement of the plurality of components requiring a supply.

In 203, it is ascertained, e.g. by the control device, whether the value satisfies a prescribed criterion.

In 204, the operation of the components requiring a supply is controlled (for example by the control device) on the basis of whether the value satisfies the prescribed criterion.

Various embodiments that are described in connection with the circuit arrangement 100 apply in similar fashion to the method shown in FIG. 2, and vice versa.

The components of the circuit arrangement (such as the control device) can be implemented by one or more circuits. In one embodiment, a "circuit" is intended to be understood to mean any unit that implements logic and that may be, alternatively, hardware, software, firmware or a combination thereof. Hence, in one embodiment, a "circuit" may be a hard-wired logic circuit or a programmable logic circuit, such as a programmable processor, e.g. a microprocessor. A "circuit" may also be intended to be understood to mean a processor that executes software, e.g. any type of computer program. In one embodiment, a "circuit" may be intended to be understood to mean any type of implementation of the functions described below.

Various embodiments are described in greater detail below.

Figure 3:
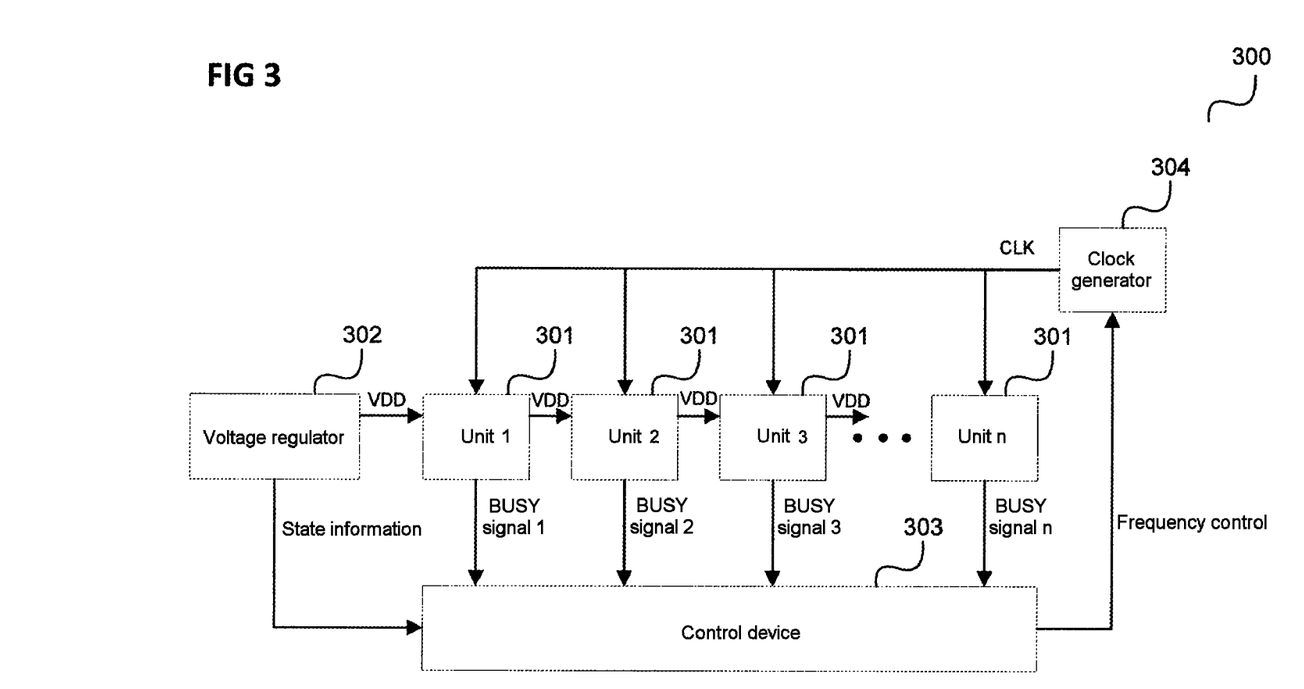
FIG. 3 shows a circuit arrangement according to an embodiment in which the control device controls the clock frequency of a clock signal delivered by a clock generator.

FIG. 3 shows a circuit arrangement 300.

By way of example, the circuit arrangement 300, is arranged fully or partially on a chip card and integrated fully or partially in one or more chips.

The circuit arrangement 300 has a plurality of components 301 requiring a supply, a voltage regulator 302, a control device 303 and a clock generator 304.

The components 301 requiring a supply are supplied with power at a supply voltage (VDD) by the voltage regulator 302. The clock generator 304 produces a clock signal that is supplied to the components 301 requiring a supply, on the basis of which the components 301 requiring a supply operate.

The control device 303 operates as a load change control unit. The components 301 requiring a supply (e.g. functional units) signal their activity to the control device 303 by means of activity signals (referred to as BUSY signals in FIG. 3).

A change in the activity signal of a component 301 requiring a supply from inactive (not busy) to active (busy) in a clock cycle means that the component requiring a supply becomes active (e.g. in the subsequent clock cycle) and a change in the power requirement by the component 301 requiring a supply is therefore imminent.

When a plurality of components 301 requiring a supply become active simultaneously, the control device can establish this by summing the activity signals. If the sum of the activity signals exceeds a prescribed threshold, this indicates that a critical load change (i.e. a rise in power consumption) is immediately imminent, for example. In order to reduce the load change, according to one embodiment the control device controls the clock generator 304 such that the clock frequency of the clock signal provided by the clock generator 304 and hence the imminent change in power consumption (e.g. change in current) is not too high (e.g. is below a limit that can be tolerated by the voltage regulator 302). By way of example, the reduction in the clock frequency may be provided for a particular period (e.g. a particular number of clock cycles). Alternatively, the clock frequency can remain in a reduced state until the sum of the activity signals falls below the threshold, for example because the threshold has been increased, e.g. in the event of the voltage regulator 302 having adapted to the increased requirement and accordingly being able to deliver a larger current, and/or because one or more components 301 requiring a supply have become inactive again, e.g. have entered a quiescent state.

The power requirement of the components 301 requiring a supply in the active state may be different. In this regard, the control device 303 can weight the activity signals differently during summation. This is shown in FIG. 4.

Figure 4:
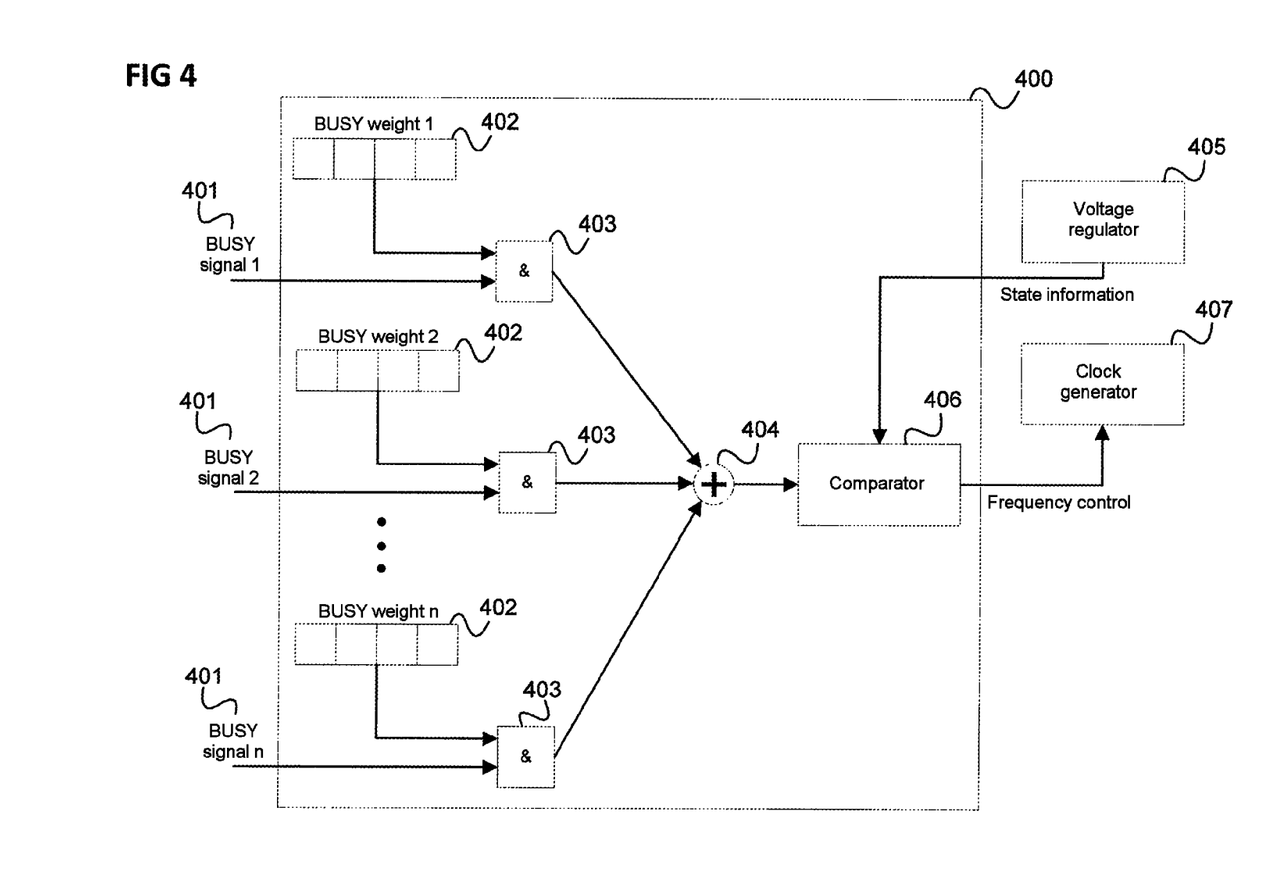
FIG. 4 shows an example of a control device that weights the activity signals from components requiring a supply.

FIG. 4 shows a control device 400, which corresponds to the control device 303, a voltage regulator 405, which corresponds to the voltage regulator 302, and a clock generator 407, which corresponds to the clock generator 304.

The control device 400 receives the activity signals (BUSY signals) 401 from the components 301 requiring a supply.

For each activity signal 401, a memory (e.g. a register) 402 is provided that contains a weight (that is to say a weight value, which is stored as a binary number, for example) for this activity signal 401 (or for the component 301 requiring a supply that transmits the activity signal 401).

Each activity signal 401 is weighted using the weight stored for this activity signal 401. By way of example, the logic level 1 of the activity signal 401 corresponds to the "active" state and the logic level 0 corresponds to the "inactive" state of the component requiring a supply. In this case, each activity signal 401 is ANDed with the weight stored for the activity signal 401, for example, by an AND gate 403, so that the result is the value of the weight for a logic level 1 of the activity signal and 0 for a logic level 0 of the activity signal.

The results of the AND functions by the AND gates 403 are added by an adder 404. The result of this addition can be regarded as a value that represents the subsequent (for example in the next clock cycle) power requirement of the plurality (i.e. of all) of the component requiring a supply.

In order to take account of the present state of the voltage regulator 405 when rating the power requirement, the voltage regulator 405 delivers a piece of digital state information that indicates the maximum tolerable load change at present, for example by indicating the maximum power that the voltage regulator 405 is able to deliver in the subsequent clock cycle.

A comparator 406 compares this state information (in the form of a digital value) with the result of the addition by the adder 404. The result is supplied to the clock generator 407. The clock generator 407 is set up to set the clock frequency of the clock signal that it delivers to a lower value when the result of the addition is above the value provided by the state information and to a higher value (for example to the normal operating clock frequency) when the result of the addition is below the value provided by the state information.

By way of example, the low value is half or a quarter of the normal operating clock frequency.

By way of example, the control device 200 is set up so that, whenever the state of a BUSY signal 401 or the state of the voltage regulator 405 changes, it performs a fresh rating of the power requirement (e.g. performs the addition of the weighted activity signals), so that the clock frequency is possibly adjusted again.

Furthermore, it should be noted that the voltage regulator can adapt to an increased power consumption, for example, and accordingly the value provided by the state information rises, so that the result of the comparison performed by the comparator 405 possibly changes and, by way of example, the clock frequency is raised to the normal value again.

If the weights have been chosen accordingly, the comparison by the comparator 405 can be regarded as ascertainment of whether, at a particular clock frequency (e.g. the normal operating clock frequency), the power consumption of the plurality of components requiring a supply is above the maximum power that the voltage regulator 405 can deliver according to the subsequent power requirement of the plurality of components requiring a supply. Accordingly, the clock frequency is set to a lower value in this case.

In various embodiments, provision is made for ascertainment of by how much the result of the addition exceeds the value provided by the state information. By way of example, a plurality of value ranges are provided that each have an associated clock frequency (e.g. in the form of a scaling factor), so that, by way of example, the clock frequency is halved when the result of the addition exceeds the value provided by the state information by a value that is in a first value range and the clock frequency is quartered when the result of the addition exceeds the value provided by the state information by a value that is in a second (higher) value range.

As an alternative to changing the clock frequency or in addition thereto, the control device can take the comparison result as a basis for adjusting other operating parameters that affect the subsequent power consumption of the plurality of components requiring a supply. By way of example, the control device can reduce the supply voltage when the result of the addition exceeds the value provided by the state information or can keep one or more of the components requiring a supply in the quiescent state when the result of the addition exceeds the value provided by the state information.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement, comprising:
    a chip including a plurality of components,
        each of the plurality of components being configured to
            receive a supply, and
            output a signal in a first clock cycle, the signal of a respective component among the plurality of components indicating a subsequent power requirement thereof for a second clock cycle, the second clock cycle being a next clock cycle that follows the first clock cycle; and
    a control device configured to
        ascertain a value that represents a subsequent power requirement of the plurality of components based on the signals therefrom,
        ascertain whether the value satisfies a prescribed criterion, and
        control an operation of at least one of the plurality of components based on whether the value satisfies the prescribed criterion.

2. The circuit arrangement of claim 1,
    wherein the prescribed criterion is whether the value is above a prescribed threshold value.

3. The circuit arrangement of claim 2, further comprising:
    a power supply component configured to
        supply power to the plurality of components, and
        output the threshold value.

4. The circuit arrangement of claim 3,
    wherein the threshold value represents a maximum power that can be supplied from the power supply component to the plurality of components.

5. The circuit arrangement of claim 1,
    wherein the control device is further configured to
        weight, for each of the plurality of components, the subsequent power requirement associated therewith using a prescribed weight, and
        ascertain the value based on the weighted power requirements.

6. The circuit arrangement of claim 5,
    wherein the control device is configured to ascertain the value by summing the weighted power requirements.

7. The circuit arrangement of claim 1,
    wherein the control device is further configured to control a clock frequency of the plurality of components based on whether the value satisfies the prescribed criterion.

8. The circuit arrangement of claim 1,
    wherein the control device is further configured to control a supply voltage for the plurality of components based on whether the value satisfies the prescribed criterion.

9. The circuit arrangement of claim 1,
    wherein the control device is further configured to keep at least one of the plurality of components in a quiescent state based on whether the value satisfies the prescribed criterion.

10. The circuit arrangement of claim 1,
    wherein the signal of the respective component further indicates a subsequent activity of the respective component.

11. The circuit arrangement of claim 1,
    wherein the signal of the respective component further indicates whether the respective component is subsequently active.

12. The circuit arrangement of claim 1,
wherein the control device is further configured to
ascertain a maximum permissible power consumption of the plurality of components,
control the operation of at least one of the plurality of components based on a first operating parameter if a power consumption of the plurality of components is not above the maximum permissible power consumption, and
control the operation of at least one of the plurality of components based on a second operating parameter if the power consumption of the plurality of components is above the maximum permissible power consumption.

13. The circuit arrangement of claim 12,
wherein the first operating parameter and the second operating parameter represent frequencies of a clock signal for the plurality of components or values of a supply voltage for the plurality of components.

14. The circuit arrangement of claim 1,
wherein the circuit arrangement is disposed on a chip card.

15. A method for controlling an operation of at least one of a plurality of components configured to receive a supply in a circuit arrangement, the method comprising:
outputting, by each of the plurality of components included in a chip, a signal in a first clock cycle, the signal of a respective component among the plurality of components indicating a subsequent power requirement thereof for a second clock cycle, the second clock cycle being a next clock cycle that follows the first clock cycle;
ascertaining a value that represents a subsequent power requirement of the plurality of components based on the signals therefrom;
ascertaining of whether the value satisfies a prescribed criterion, and controlling an operation of at least one of the plurality of components based on whether the value satisfies the prescribed criterion.

16. A chip card, comprising:
a plurality of components,
each of the plurality of components being configured to output a signal in a first clock cycle, the signal of a respective component among the plurality of components indicating a subsequent power requirement thereof for a second clock cycle, the second clock cycle being a next clock cycle that follows the first clock cycle; and
a control device configured to
ascertain the subsequent power requirement for each of the plurality of components based on the signal of the respective component,
ascertain a value that represents a subsequent power requirement of the plurality of components based on the ascertained power requirements,
ascertain whether the value satisfies a prescribed criterion, and
control the operation of the plurality of components based on whether the value satisfies the prescribed criterion.

17. The circuit arrangement of claim 1,
wherein the control device is further configured to control a clock frequency of the plurality of components based on an extent to which a power consumption of the plurality of components exceeds a maximum permissible power consumption of the plurality of components.

18. The circuit arrangement of claim 17,
wherein the control device is further configured to reduce the clock frequency of the plurality of components by a first degree based on whether the power consumption of the plurality of components is within a first threshold range exceeding the maximum permissible power consumption of the plurality of components.

* * * * *